July 6, 1937.  F. ZIELASKO  2,086,310
GARDEN OR PLANT BED COVER
Filed April 6, 1936
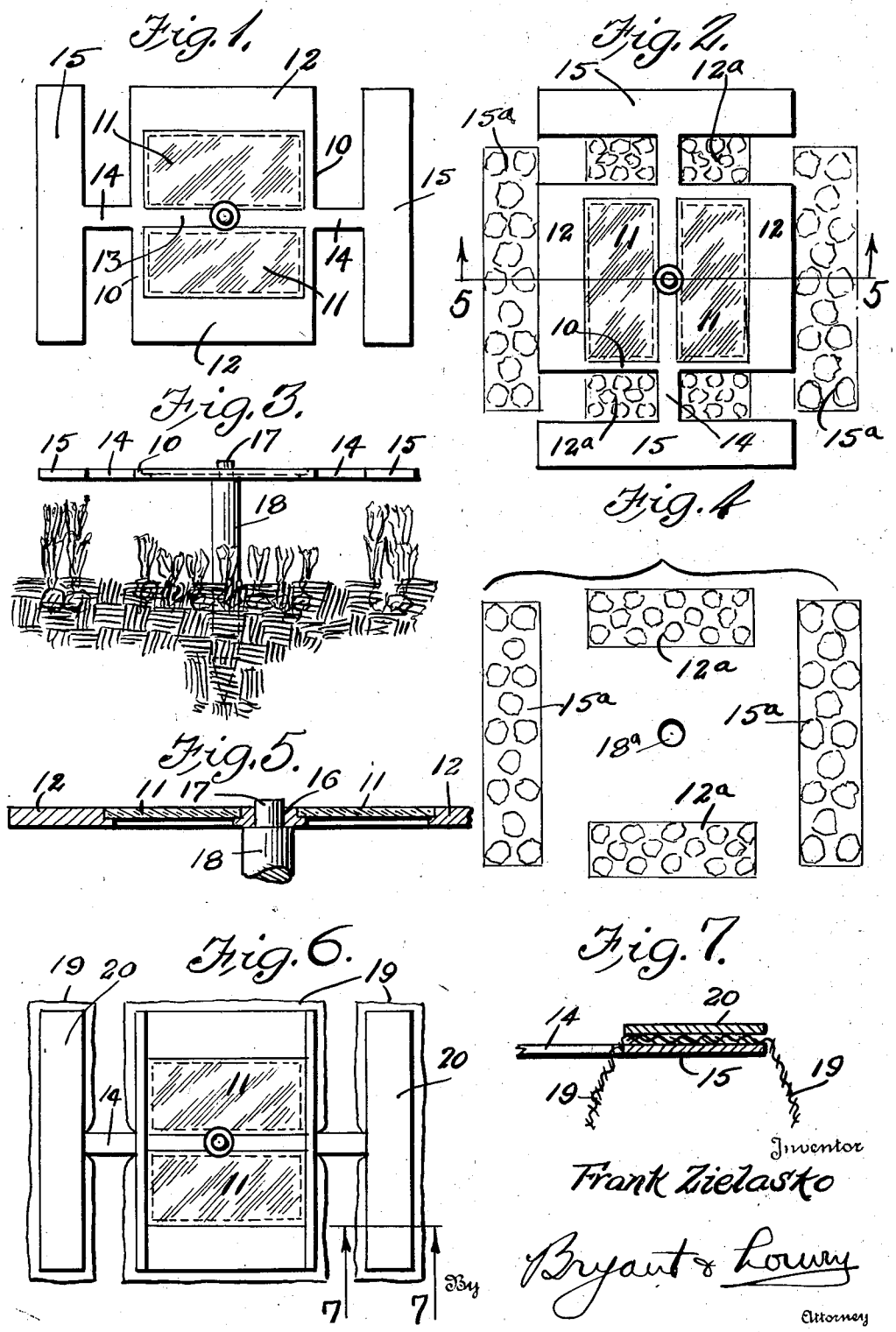

Patented July 6, 1937

2,086,310

UNITED STATES PATENT OFFICE 2,086,310

GARDEN OR PLANT BED COVER

Frank Zielasko, Luscar, Alberta, Canada

Application April 6, 1936, Serial No. 73,035

6 Claims. (Cl. 47—26)

This invention relates to certain new and useful improvements in garden or plant bed covers.

The primary object of the invention is to provide a garden or plant bed cover wherein the cover is in the form of a frame structure of general rectangular formation and is rotatably supported above a garden or plant bed of a general design similar to the cover so that in one position of the cover the garden or plant bed is shielded while in another position of the cover the garden or plant bed is exposed.

A further object of the invention is to provide a garden or plant bed cover of the foregoing character wherein the cover comprises substantially rectangular elongated plate sections from which fabric sheets or curtains depend from the side edges thereof to form a top and side closure for the garden or plant bed plot.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a top plan view of a garden or plant bed cover constructed in accordance with the present invention, showing four elongated plate sections constituting covers and a central glass section permitting the passage of sunlight through the cover;

Figure 2 is a top plan view of the cover, similar to Figure 1 and further illustrating the garden or plant bed exposed by the plate sections of the cover;

Figure 3 is a side elevational view of the cover with the earth shown in section;

Figure 4 is a plan view of the garden or plant bed with the cover removed;

Figure 5 is a cross-sectional view taken on line 5—5 of Figure 2, showing the cover rotatably mounted upon the upper end of a post that is fragmentarily illustrated;

Figure 6 is a top plan view of another form of cover in which the rectangular plate portions are provided with depending or hanging curtains; and Figure 7 is a detail sectional view taken on line 7—7 of Figure 6.

Referring more in detail to the accompanying drawing, the garden or plant bed cover is of plate formation and substantially rectangular in character, embodying a central portion 10 having rectangular openings therein to be closed by glass plates 11 at opposite sides of the center portion and defining outer side closed plate portions 12 of elongated rectangular formation, the glass sections 11 being spaced by a central rib 13. A reduced neck 14 extends from each end of the central frame portion 10 in line with the central rib 13 and each neck at its outer end carries a transversely extending cover plate section 15, the ends of which terminate substantially in line with the outer side edges of the side plate sections 12.

As shown in Figure 5, the central rib 13 is provided with a center opening 16 for reception on the reduced pin 17 rising from the post 18 that is ground anchored as shown in Figure 3, the cover being rotatably mounted upon the upper end of the post 18.

As shown in Figure 4, the garden or plant bed is laid out to include plots 12a and 15a of the same general dimensions as the plate sections 12 and 15 of the cover and the ground opening 18a is arranged centrally of the plots 12a and 15a.

When the garden or plant bed cover is in the position shown in Figure 2 with respect to said plots, the latter are exposed or uncovered, but when the cover is rotated through an arc of 90°, the cover plates 12 and 15 respectively cover the garden plots 12a and 15a. When the plots are covered, the rays of the sun may pass thereto through the glass plates 11.

In the form of the invention illustrated in Figures 6 and 7, the construction of cover is substantially the same as that shown in Figures 1 to 5 except that the depending curtains or shields 19 are carried by the cover plates 12 and 15 and are retained in position thereon by means of retainer plates 20 mounted thereover and with a device of this character, a top and side wall enclosure is provided for the plant plots.

From the above detailed description of the invention, it is believed that the construction and operation thereof will at once be apparent and while there are herein shown and described the preferred embodiments of the present invention, it is nevertheless to be understood that minor changes may be made therein without departing from the spirit and scope of the invention as claimed.

I claim:—

1. In a garden or plant bed cover, a perpendicular post, a plate frame rotatably supported in a horizontal plane on the upper end of the post, the frame including a central glass portion and elongated rectangular plate portions adapted for overlying or exposing similarly shaped plant bed plots.

2. In a garden or plant bed cover, a perpendicular post, a plate frame rotatably supported in a horizontal plane on the upper end of the post, the frame including a central glass portion and a rectangular plate portion at each side of the glass portion and a rectangular plate portion at each end of the glass portion, said frame adapted to be rotated for moving the plate portions to overlie similarly shaped plant bed plots or to expose the latter.

3. In a garden or plant bed cover, a perpendicular post, a plate frame rotatably supported in a horizontal plane on the upper end of the post, the frame including a central glass portion and a rectangular plate portion at each side of the glass portion and a rectangular plate portion at each end of the glass portion, spaced outwardly thereof and of a length to have its ends terminate in line with the outer edges of the side plate portions, said frame adapted to be rotated for moving the plate portions to overlie similarly shaped plant bed plots or to expose the latter.

4. In a garden or plant bed cover, a perpendicular post, a plate frame rotatably supported in a horizontal plane on the upper end of the post, the frame including a central glass portion and elongated rectangular plate portions adapted for overlying or exposing similarly shaped plant bed plots, and curtains depending from the plate portions to provide side inclosures for the plant bed plots.

5. In a garden or plant bed cover, a perpendicular post, a plate frame rotatably supported in a horizontal plane on the upper end of the post, the frame including a central glass portion and a rectangular plate portion at each side of the glass portion and a rectangular plate portion at each end of the glass portion, said frame adapted to be rotated for moving the plate portions to overlie similarly shaped plant bed plots or to expose the latter, and curtains depending from the plate portions to provide side inclosures for the plant bed plots.

6. In a garden or plant bed cover, a perpendicular post, a plate frame rotatably supported in a horizontal plane on the upper end of the post, the frame including a central glass portion and a rectangular plate portion at each side of the glass portion and a rectangular plate portion at each end of the glass portion, spaced outwardly thereof and of a length to have its ends terminate in line with the outer edges of the side plate portions, said frame adapted to be rotated for moving the plate portions to overlie similarly shaped plant bed plots or to expose the latter, and curtains depending from the plate portions to provide side inclosures for the plant bed plots.

FRANK ZIELASKO.